(12) United States Patent
Frendle et al.

(10) Patent No.: US 6,253,819 B1
(45) Date of Patent: Jul. 3, 2001

(54) METHOD AND APPARATUS FOR DIE CUTTING AND MAKING LAMINATE ARTICLES

(75) Inventors: Steven Kenneth Frendle, Kearney; John Robert Manley, Sibley, both of MO (US)

(73) Assignee: Denovus LLC, Excelsior Springs, MO (US)

( * ) Notice: Subject to any disclaimer, the term of this patent is extended or adjusted under 35 U.S.C. 154(b) by 0 days.

(21) Appl. No.: 09/300,387

(22) Filed: Apr. 27, 1999

Related U.S. Application Data
(60) Provisional application No. 60/083,290, filed on Apr. 28, 1998.

(51) Int. Cl.[7] .................................................. B32B 31/00
(52) U.S. Cl. ..................... 156/518; 156/520; 156/264; 156/265; 156/269; 156/270; 283/70; 283/75; 283/94; 493/346
(58) Field of Search .................................. 156/264, 265, 156/269, 270, 520, 267, 518; 283/70, 75, 94; 493/346

(56) References Cited

U.S. PATENT DOCUMENTS

| | | | |
|---|---|---|---|
| 3,889,863 | 6/1975 | Deslauriers ............................. 225/99 |
| 4,016,786 | 4/1977 | Körner ..................................... 83/863 |
| 4,333,781 | * 6/1982 | Meulenberg ........................... 156/152 |
| 4,405,401 | 9/1983 | Stahl ...................................... 156/248 |
| 4,427,481 | 1/1984 | Smith et al. ........................ 156/306.6 |
| 4,664,736 | * 5/1987 | Faasse, Jr. ............................. 156/264 |
| 4,846,774 | 7/1989 | Bell ......................................... 493/87 |
| 4,874,650 | 10/1989 | Kitoh et al. ............................. 428/68 |
| 4,978,415 | 12/1990 | Jones ..................................... 156/517 |
| 5,040,803 | 8/1991 | Cieslik et al. ......................... 277/316 |
| 5,266,133 | 11/1993 | Hanley et al. .......................... 156/71 |
| 5,296,071 | 3/1994 | Tapp ...................................... 156/267 |
| 5,373,027 | 12/1994 | Hanley et al. ....................... 521/84.1 |
| 5,411,390 | 5/1995 | Fay ........................................ 425/145 |
| 5,417,132 | 5/1995 | Cox et al. ............................... 83/116 |
| 5,515,757 | 5/1996 | O'Connor et al. .................... 83/347 |
| 5,678,826 | 10/1997 | Miller ................................... 277/316 |

FOREIGN PATENT DOCUMENTS

| | | |
|---|---|---|
| 33 26 776 | 2/1985 | (DE) . |
| 0 730 998 | 9/1996 | (EP) . |
| 0 773 177 | 5/1997 | (EP) . |
| 1 192 956 | 10/1959 | (FR) . |
| 865 165 | 4/1961 | (GB) . |
| 97 27032 | 7/1997 | (WO) . |

\* cited by examiner

*Primary Examiner*—Linda Gray
(74) *Attorney, Agent, or Firm*—Michael D. Bednarek; Shaw Pittman

(57) ABSTRACT

A method and apparatus that produces shaped and laminate articles and recovers the excess material or flash as a part of the manufacturing process. The apparatus uses a combination of rotary die and anvil roller assemblies in successive multiple stations to cut and separate each raw material into final product portions and recyclable flash portions as each raw material enters the apparatus. The apparatus separately reclaims each raw material flash portion and delivers the flash of each material in a recyclable form to an auxiliary recycling operation. In recovering the flash, the apparatus does not adversely affect the speed or quality of production of the final shaped or laminated product. To ease removal of the flash, the apparatus applies lubricant to the blades of the rotary die. To avoid damage to web material, the apparatus uses vacuum belts to convey the web material and web product through the apparatus.

29 Claims, 11 Drawing Sheets

METHOD AND APPARATUS FOR DIE CUTTING AND MAKING LAMINATE ARTICLES

The present application claims priority from the filing date of the provisional patent application Ser. No. 60/083, 290 filed Apr. 28, 1998, entitled "Method and Apparatus for Die Cutting and Making Laminate Articles."

BACKGROUND

1. Field of the Invention

The present invention relates to a method and an apparatus for making shaped and laminate articles, and more particularly, to an apparatus that recovers excess material or flash for recycling as a part of the shaping and laminating process.

2. Background of the Invention

Rotary dies and methods of using such dies are conventionally used in this art to produce shaped and laminated articles of continuous lengths or discrete shapes. Examples of such articles include seals and gaskets, expandable articles for automotive uses, diapers, edible items such as cereal, printed matter such as labels and cardboard boxes, and other sheet goods.

U.S. Pat. Nos. 4,427,481; 5,266,133; 5,373,027; 5,678, 826; 5,040,803; 4,874,650; and EP 0 730 998B1 disclose methods and apparatus that fabricate automotive expandable sealants. U.S. Pat. Nos. 5,411,390; 5,417,132; and 5,515,757 illustrate examples of conventional shaping and laminating methods and apparatus, the disclosure of each of which is hereby incorporated by reference. While conventional methods and apparatus are useful for making articles, there is a need in the art for methods and apparatus that reduce material cost without compromising the efficiency of the apparatus or the quality of the produced articles.

Conventional shaping and lamination apparatus typically do not recycle unused raw material as a part of the manufacturing process. Often the raw material is shaped and formed into a final product and cut-away portions of material, known as flash, are collected as an afterthought. The typical apparatus do not recover the flash in a systematic manner that facilitates recycling. Thus, much of the unused raw material is thrown away and wasted.

Laminate products present additional obstacles to recycling. Even if an apparatus recovers the flash from a laminate product, often the multiple layers of varying materials are inseparable and incompatible with recycling operations. Thus, if the apparatus collects the laminate flash at the end of the manufacturing process, the flash cannot be recycled.

In addition to inadequate flash removal, the rotary die apparatus known in the art present three other significant drawbacks. First, conventional apparatus typically use individual rotary processing stations. Therefore, when the machines must be re-tooled to accommodate new products, the single individual station must be taken out of service for extended periods of time. The prior art apparatus do not provide means to quickly change shaping or laminating functions without curtailing production.

Second, conventional rotary die apparatus regulate web tension with nip or pinch rollers. In conveying the web material, these rollers must contact the top of the web material. Often, the pinching action of these rollers damages the web material and diminishes the quality of the final product. The prior art apparatus do not provide means to consistently convey the web material without excessive, deleterious handling.

Finally, in facilitating flash removal, conventional rotary die apparatus spray lubricant on the entire web material and rotary die. Such a method uses excessive amounts of lubricant and degrades the quality of the web material because of over-saturation. The prior art apparatus do not provide means to apply minimal amounts of lubricant to the specific locations at which lubrication is needed for effective flash removal.

For the foregoing reasons, there remains a need for an apparatus that cuts and segregates flash from a web material before the material is laminated to another web material. The apparatus should effectively remove flash using careful handling and lubrication means to avoid degrading the quality of the final product. Further, the apparatus should provide means to easily and quickly change the shaping or lamination functions without hindering production.

SUMMARY OF THE INVENTION

The present invention provides a method and apparatus for die cutting and making shaped and laminated articles in a process that efficiently recovers unused recyclable flash material without adversely impacting production speed or quality. The present invention reduces material waste in the shaping of a web of material or the laminating of at least two films, layers or web stock and also permits changing or modifying the product being produced without stopping production.

To shape and laminate product material while continuously separating flash, the apparatus uses a novel, multi-station arrangement of stepped anvil rollers, regular anvil rollers, vacuum conveyor belts, and lubrication systems.

For the shaping configuration, a web material is fed between an anvil roller and rotary die. Depending on the number of layers in the web and the desired cut, the anvil roller is either stepped to produce a through-cut or is regular to produce a kiss-cut. A kiss-cut is a cut through part, but not all of a multi-layered article, wherein the cutting die gently or lightly cuts the web material without cutting the liner or substrate. After the die and anvil roller cut the web, a flash removal mechanism, e.g., conveyor belt, vacuum nozzle, or web rewind, removes the web flash and delivers the flash to a recycling operation. To ease removal of the flash, a lubrication system applies lubricant directly to the blades of the rotary die before the die contacts the web material.

For the lamination configuration, two anvil rollers are positioned adjacent to and on opposite sides of a rotary die. The two anvil rollers are referred to hereinafter as the first anvil roller and second anvil roller. This die and anvil roller configuration enables the feeding of two web materials. In the horizontal plane, a primary web material is fed between the rotary die and second anvil roller. From above the apparatus, a secondary web material, e.g., a film, is fed between the rotary die and first anvil roller.

The first anvil roller and rotary die cut the secondary web material into two portions, secondary web flash and secondary web product, before the secondary web product contacts the primary web material. Thus, the secondary web flash is removed before the materials are laminated and no longer suitable for recycling. The secondary web product meets the primary web material as both materials enter between the rotary die and second anvil roller. As the materials meet, they are laminated and the primary web material is cut into two portions: primary web flash and primary web product. The primary web flash is removed for recycling and the primary web product continues on a horizontal conveyor for further processing or packaging.

Like the shaping configuration, in the lamination configuration, a lubricant system improves flash removal by applying lubricant directly to the blades of the rotary die before the die contacts the secondary web material or primary web material. Additionally, the first and second anvil rollers can be either stepped or regular to produce the desired cut and the flash removal mechanism can be tailored to meet recycling requirements, e.g., conveyed, vacuumed, or rewound.

A further embodiment of the present invention incorporates the above-described shaping and lamination configurations in a multi-station system in which successive die and anvil roller assemblies are positioned along a production line. The die and anvil roller assemblies are mounted on lifting mechanisms, e.g., pneumatic cylinders, that allow the assemblies to be raised and taken out of service. When raised, the rotary die does not contact the primary web material and therefore does not shape or laminate. In this manner, the shaping and lamination functions can be stopped and started while the web materials are continuously fed.

Accordingly, it is an object of the present invention to provide a means for cutting a web material and removing flash before the web material contacts another web material in a lamination process.

It is another object of the present invention to deliver a web material to a rotary die without contacting or handling the top of the web material so as to reduce the possibility of damaging the web material.

It is another object of the present invention to enable quick changes between shaping and lamination functions in a die cutting apparatus.

It is another object of the present invention to provide a lubrication system for a die cutting apparatus that minimizes wasted lubricant and reduces degradation of the web material from over-saturation.

These and other objects of the present invention are described in greater detail in the detailed description of the invention, the appended drawings and the attached claims.

DESCRIPTION OF THE DRAWINGS

FIG. 1b is a top view of the apparatus shown in FIG. 1a.

FIG. 1c is a rear view of the apparatus shown in FIG. 1a.

FIG. 1d is a front view of the apparatus shown in FIG. 1a.

DETAILED DESCRIPTION OF THE INVENTION

Figure 1A:
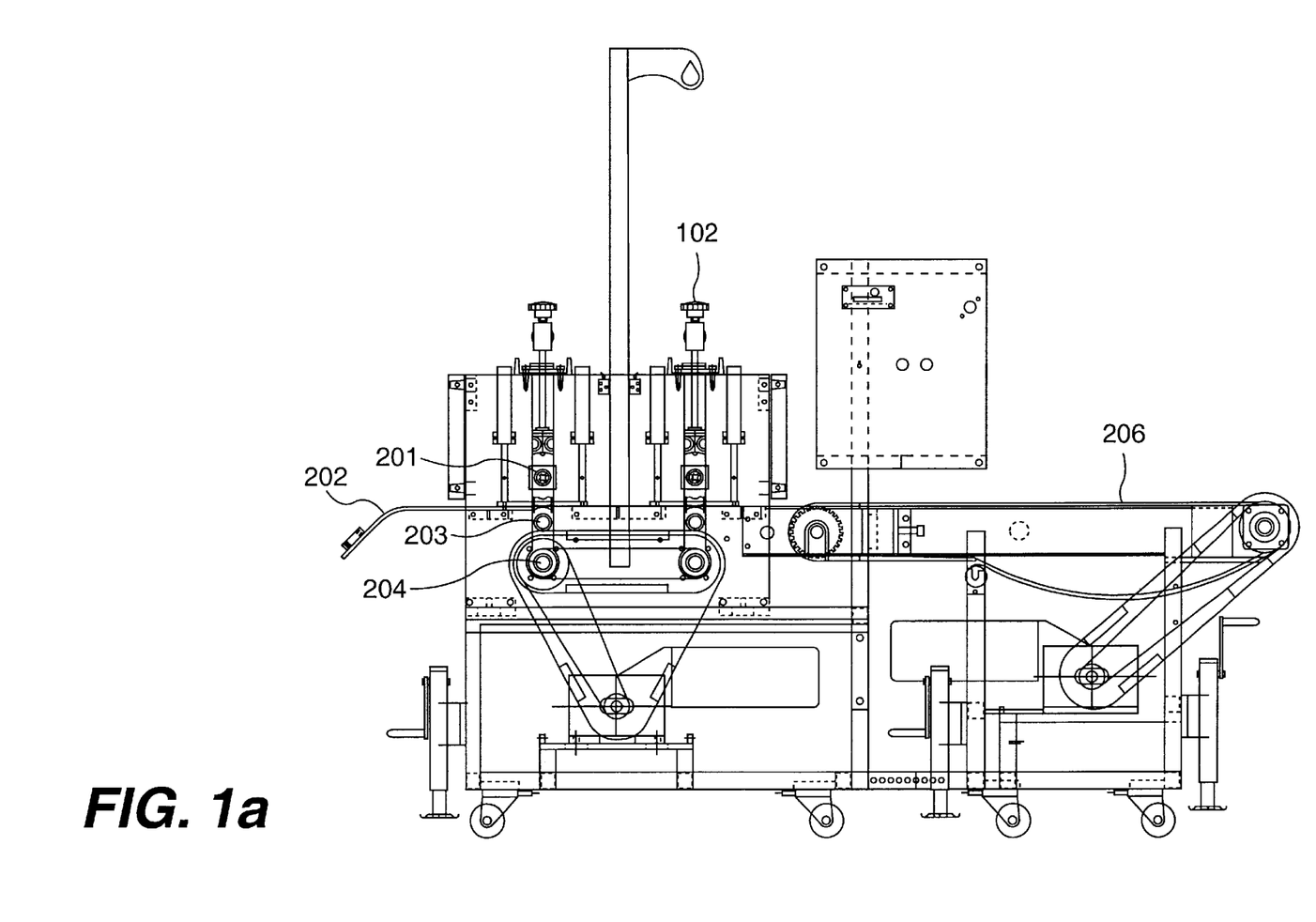
FIG. 1a is a side view of one aspect of the die cutting apparatus of the present invention.
Figure 1B:
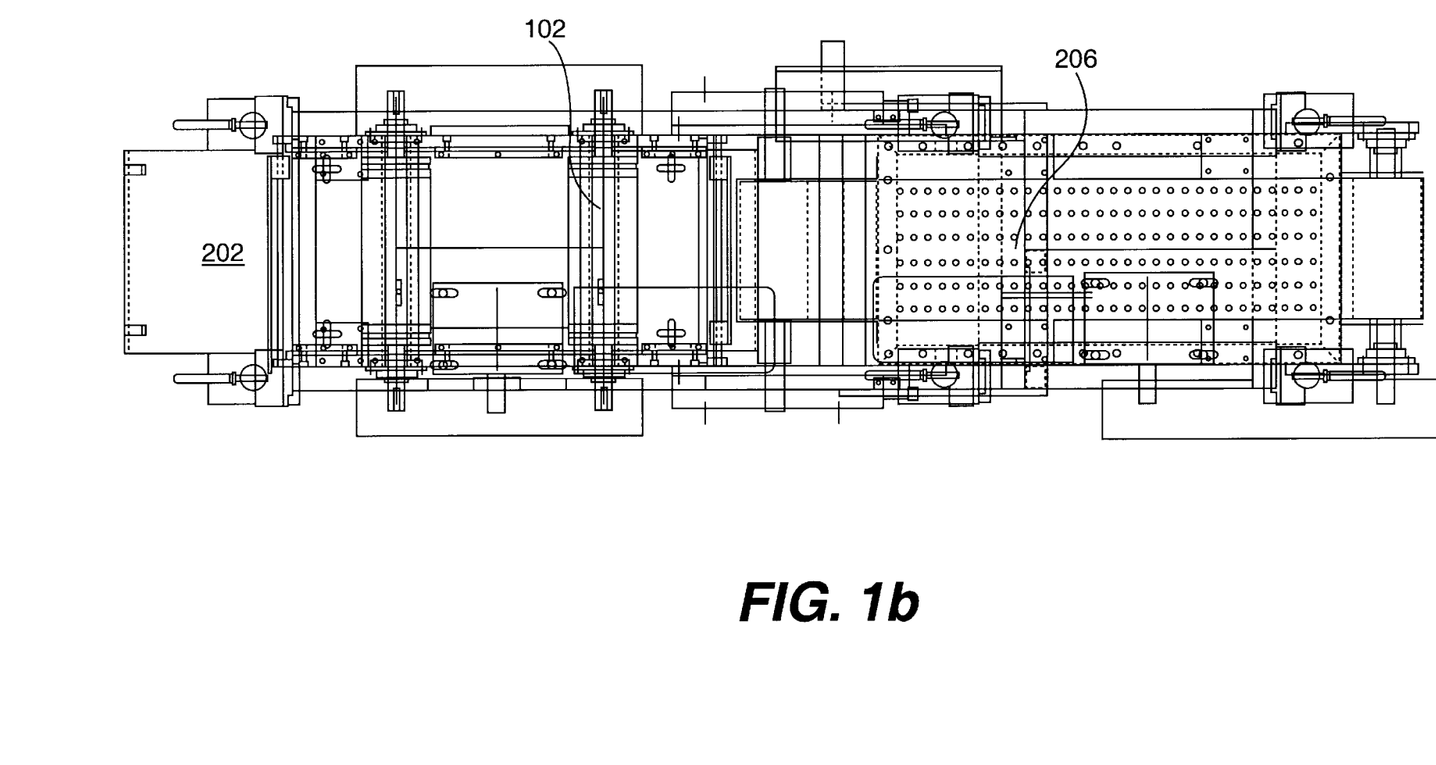
Figure 1C:
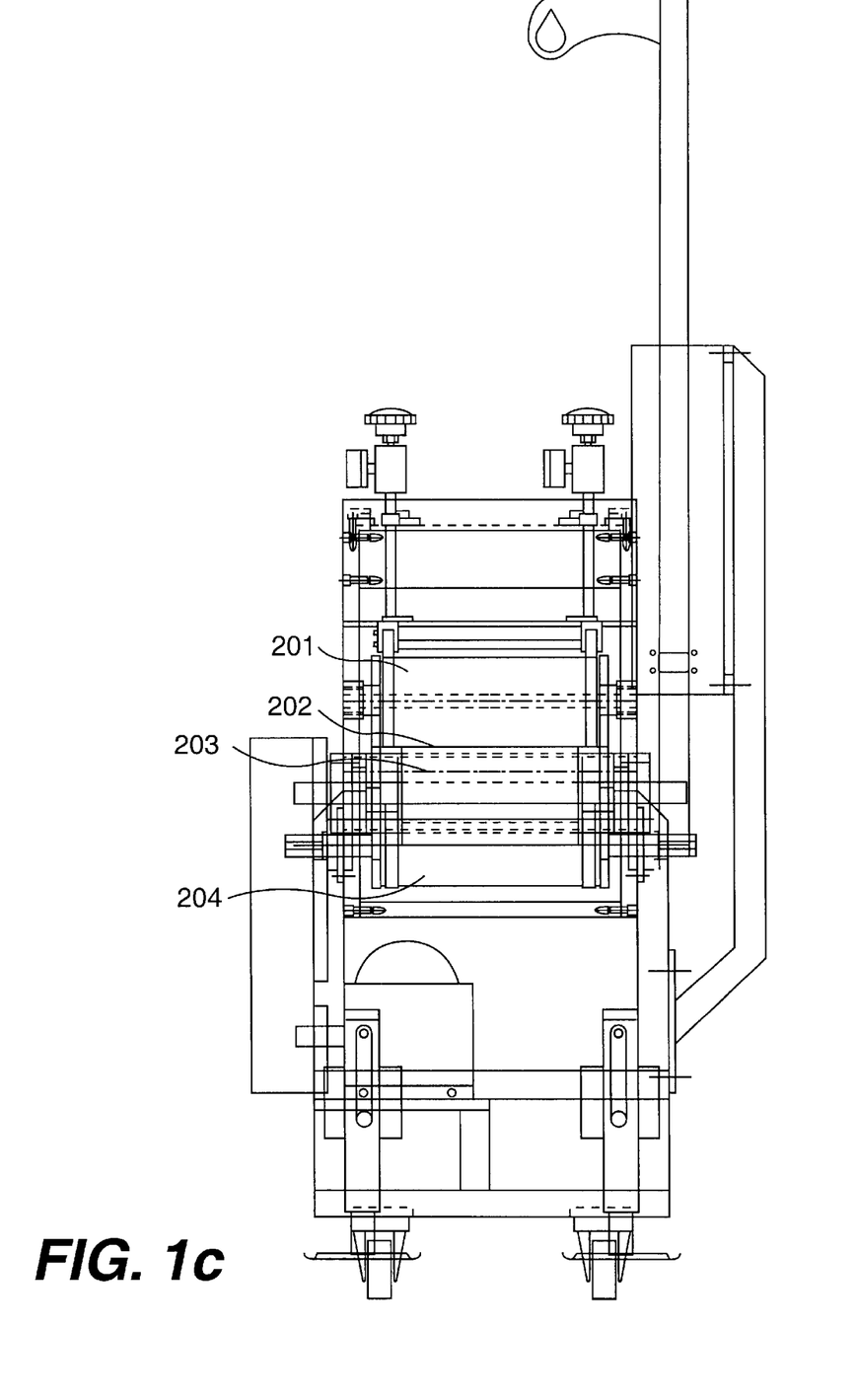
Figure 1D:
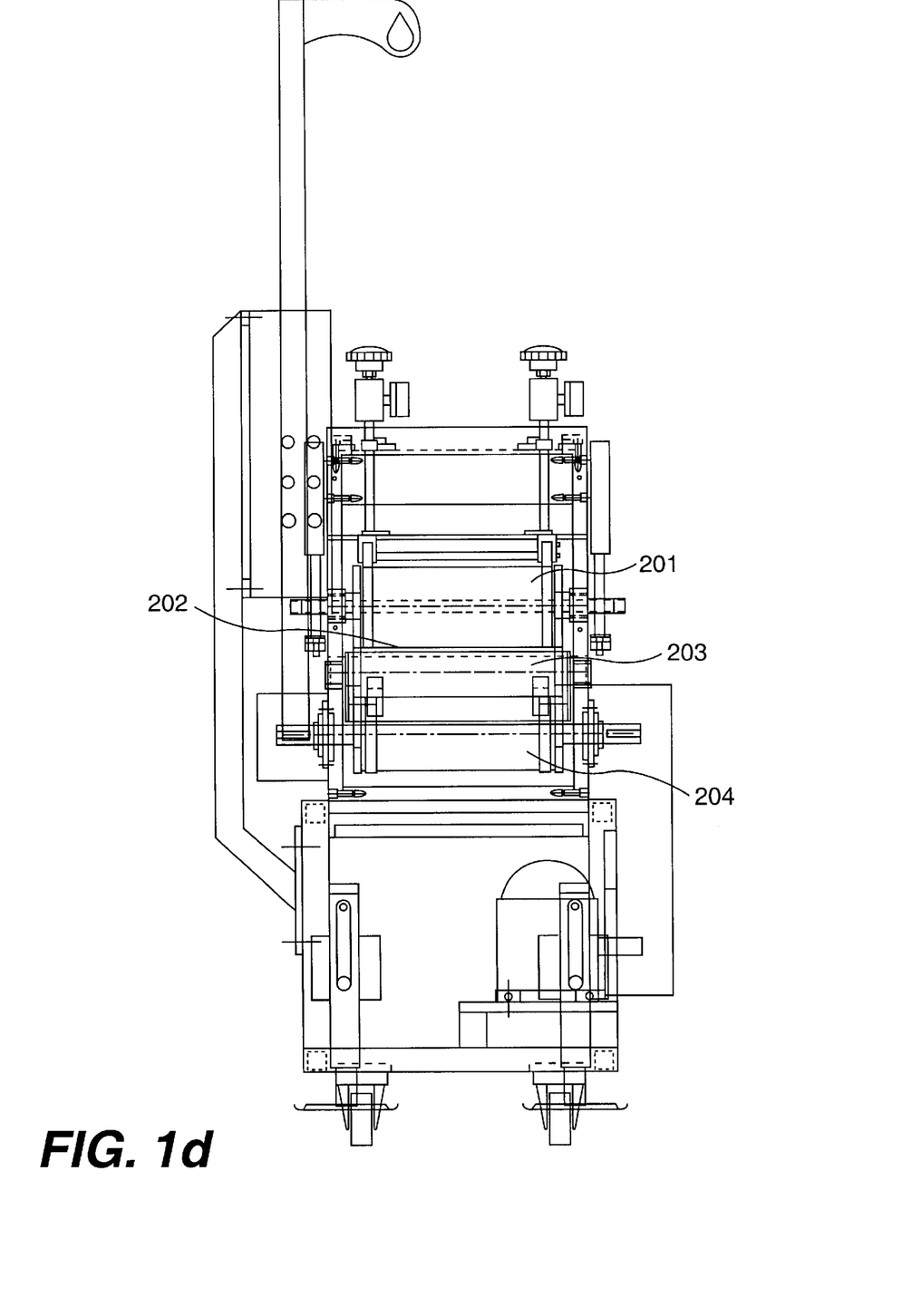
Figure 2:
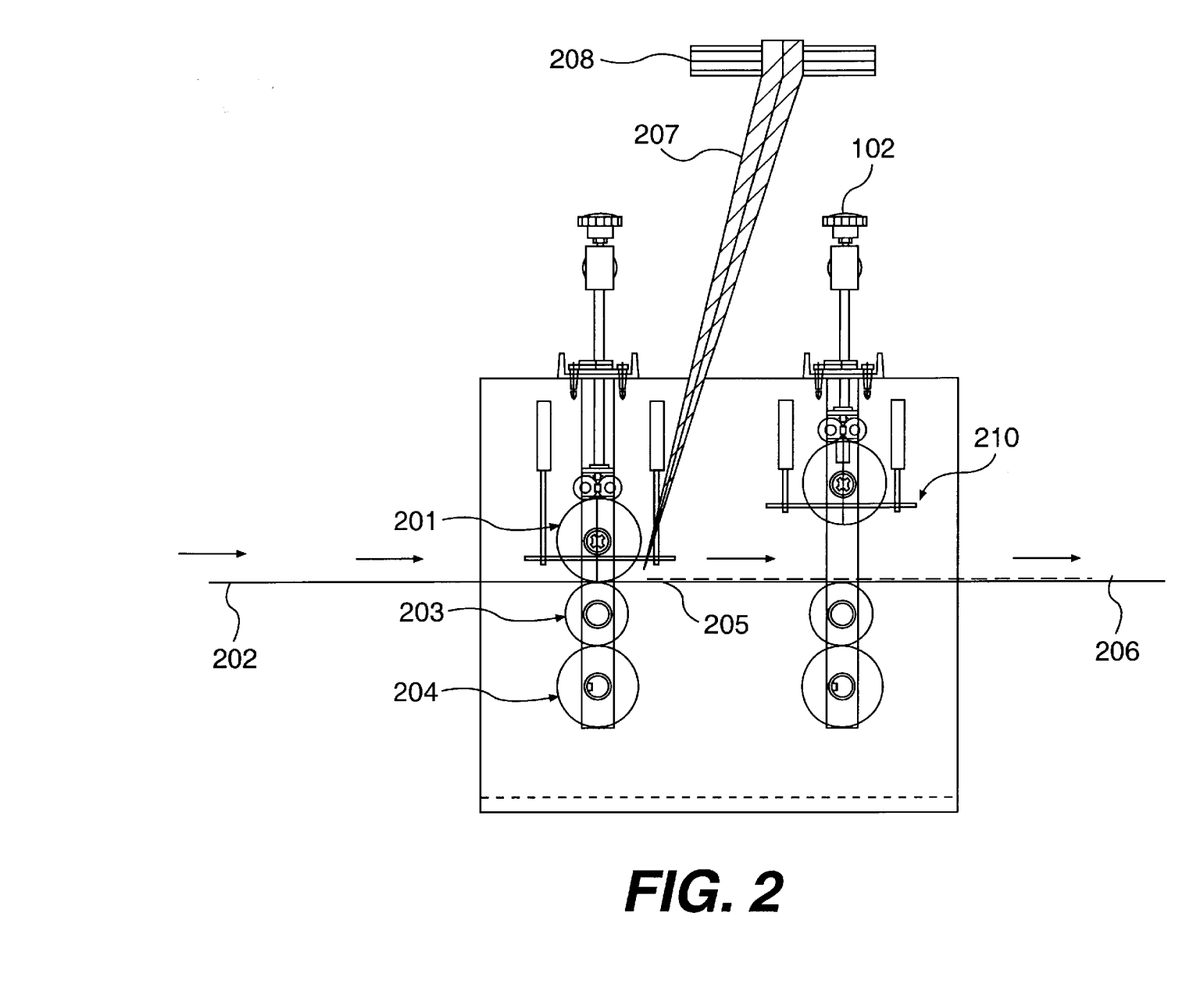
FIG. 2 is a schematic of a section of a third portion of the die cutting apparatus illustrated in FIG. 1 in a shaping configuration.
Figure 3:
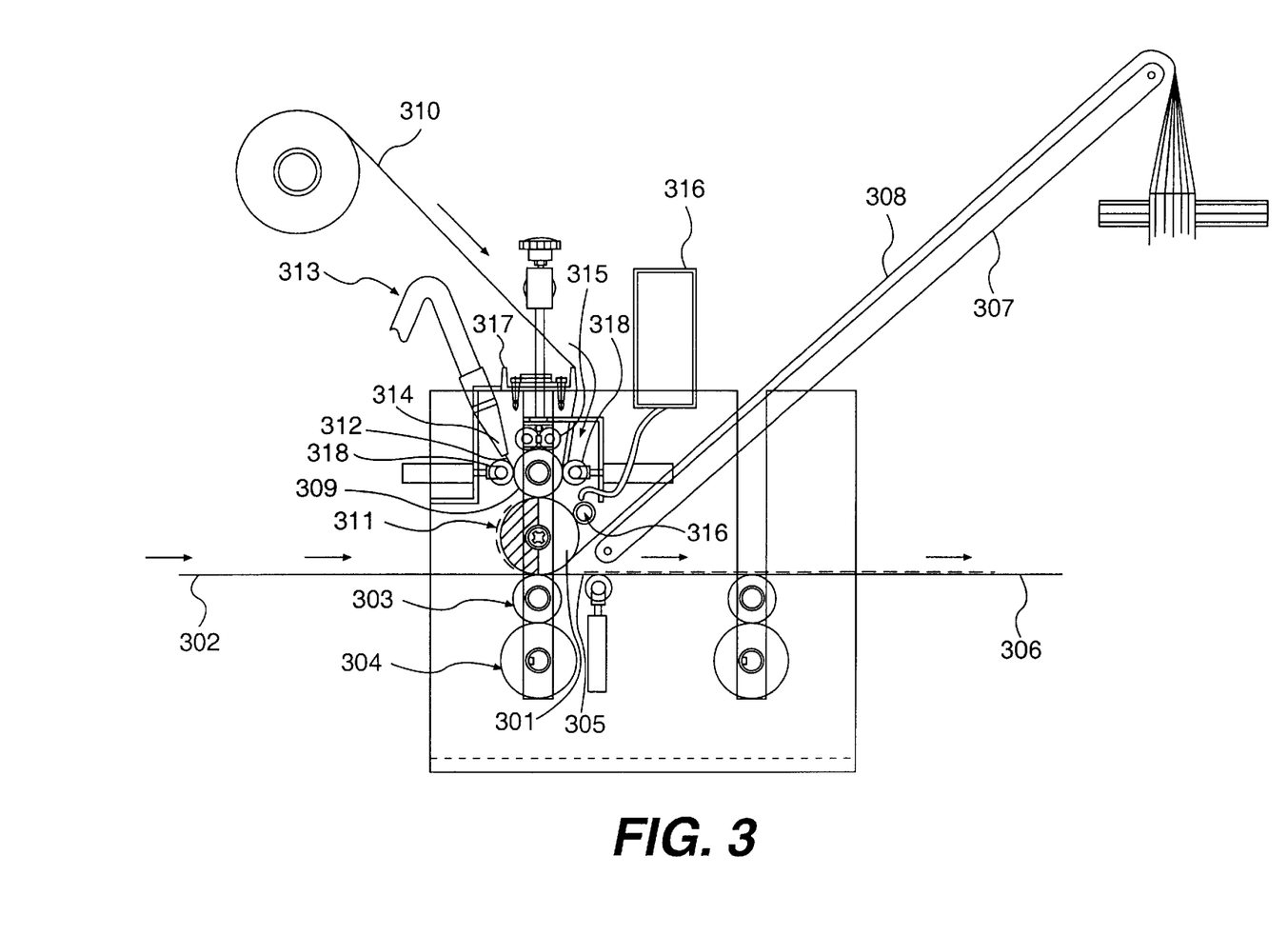
FIG. 3 is a detail side view, partially in section, of a second aspect of the die cutting apparatus illustrated in FIG. 1 in a lamination configuration.
Figure 4:
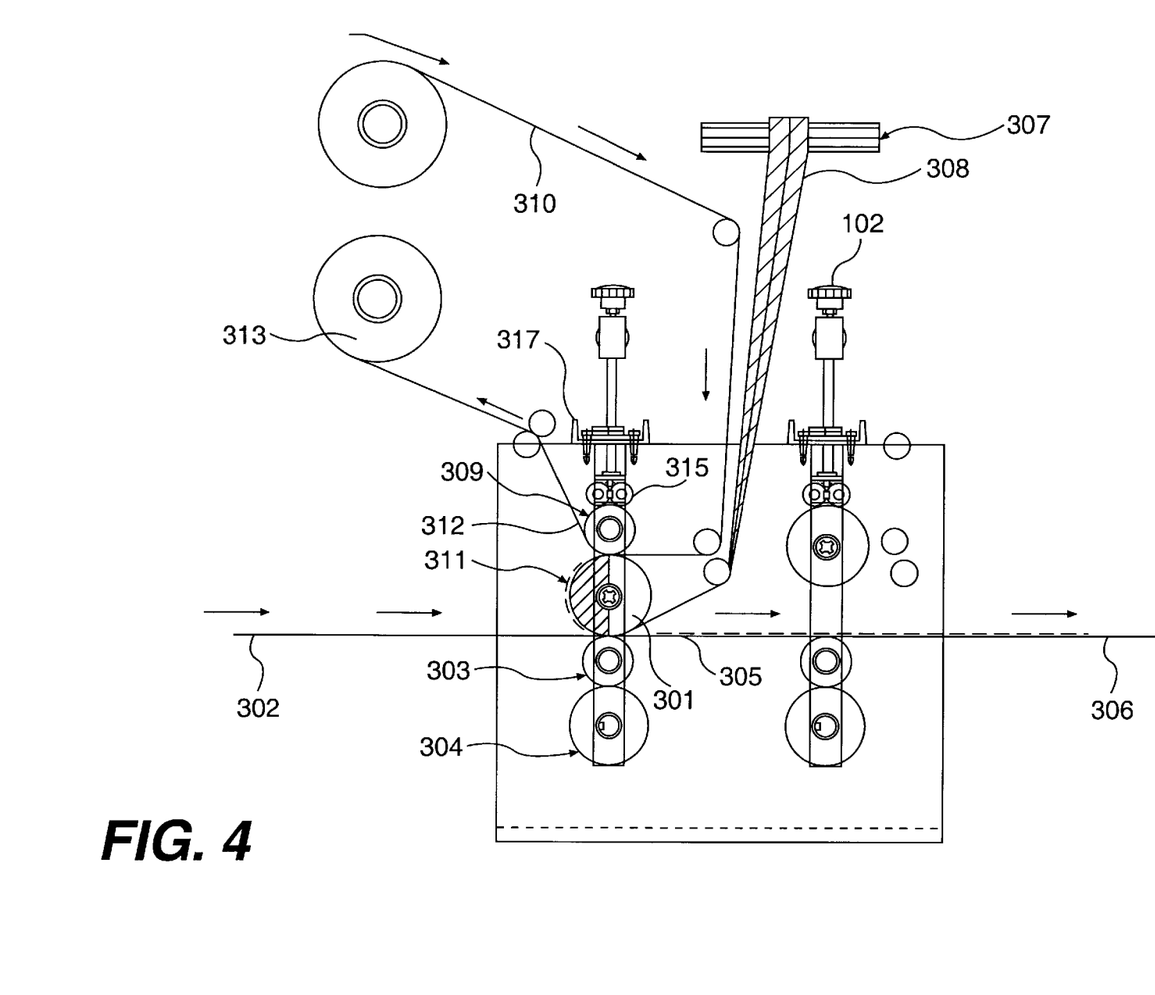
FIG. 4 is a detail side view, partially in section, of a portion the die cutting apparatus illustrated in FIG. 1 in a laminating configuration.

Referring to the drawings, the present invention comprises an apparatus and a method for forming a shaped or laminate product, using at least one rotary die, at least one anvil roller and at least one support or drive roller. FIGS. 1a–1d illustrate the preferred embodiment of the present invention as a part of a larger, manufacturing apparatus. The present invention processes web material in two configurations: shaping and lamination. FIG. 2 depicts the preferred embodiment of the present invention in the shaping configuration. FIGS. 3–4 show the preferred embodiment of the present invention in the lamination configuration. In each configuration, as the process materials are cut, excess material known as flash is recovered for recycling.

FIG. 2 shows the die cutting apparatus configured to produce shaped products, in which primary web material 202, in sheet or web form, enters the apparatus between rotary die 201 and anvil roller 203, at which point rotary die 201 cuts primary web material 202 into primary web flash 207 and primary web product 205. As explained below, primary web material 202 is preferably carried on a continuing web-like liner. Primary web flash 207 is removed by primary web flash removal mechanism 208, which conveys primary web flash 207 away from the apparatus to a recycling apparatus (not shown). Primary web product 205 exits the apparatus and continues in the manufacturing process to become the final product 206. In the shaping configuration, the present invention produces a shaped or continuous two-dimensional article.

Rotary die 201 and anvil roller 203 rotate in opposite directions so that primary web material 202 is drawn into the apparatus upon contact with rotary die 201 and anvil roller 203. Support roller 204 drives anvil roller 203 and longitudinally supports and stabilizes the drums of anvil roller 203 and rotary die 201 to ensure even feeding of primary web material 202.

Figure 2A:
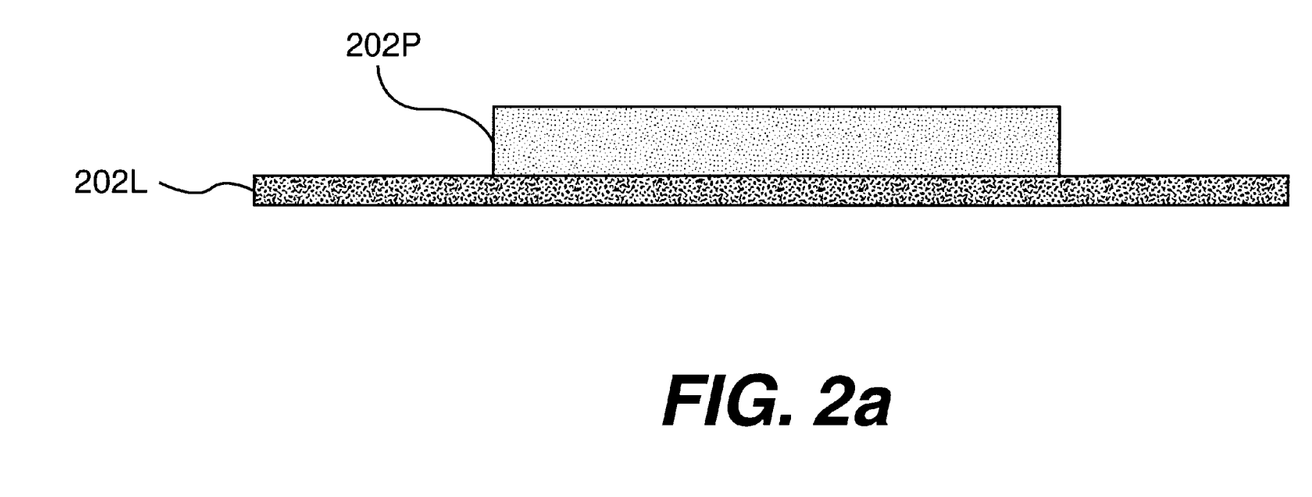
FIG. 2a is a schematic of a multi-layered primary web material.

Primary web material 202 can be made of more than one layer, e.g., a product layer 202P attached to a liner 202L, as shown in FIG. 2a. In shaping this multi-layered primary web material, rotary die 201 is mated with a regular anvil to produce kiss-cut in which only the top or product layer 202P of primary web material 202 is cut, leaving liner 202L intact. As primary web material 202 exits between rotary die 201 and anvil roller 203, primary web flash 207, which is outside of the shape of primary web product 205, is removed from liner 202L and recycled. As a result, primary web product 205 remains on liner 202L and exits the die cutting apparatus as final product 206. Examples of suitable liners include paper (coated or uncoated), polyethylene, polyester, aluminum foil, brass foil, copper foil, or other similar substrates.

The use of a product layer 202P on a liner 202L according to the present invention is particularly useful when final product 206 is a tacky material adhered to a liner, e.g., when a temporary, removable layer is applied to primary web product 205 to provide protection until primary web product 205 is ready for use. In this application, a tacky material such as a mastic is extruded as a web upon liner 202L and, thereafter, introduced together as primary web material 202 into the die cutting apparatus wherein rotary die 201 cuts through or shapes the mastic portion without cutting the underlying liner 202L. An example of a product on a liner is rubber butyl based mastic laminated with a non-tacky rubber butyl web, for use in such applications as seals for automotive or other general-purpose uses.

The web materials and liners can be fabricated by many different methods, e.g., extrusion, spraying material onto a liner, and immersion. In each case, in the preferred embodiment of the present invention, the die and anvil roller is customized to produce the cut required by the web materials, liners, and the desired final product. Customizing the cut includes, but is not limited to, such factors as the shape of the cut and the number of layers to be cut, i.e., whether a through-cut or kiss-cut is required.

FIGS. 3 and 4 illustrate the die cutting apparatus configured to produce laminate products. Laminate products are constructed of multiple layers of material, which are indistinguishable when joined in the final product. Examples of layers that can be laminated together include rubber butyl based-mastic, polyethylene, polyester, metal foils, MYLAR®, or other similar materials. FIGS. 3 and 4 depict the same laminating process but with different means of flash removal. FIG. 3 show flash removal by vacuum and conveyor whereas FIG. 4 shows flash removal by rewinding to a core.

For the laminating configuration, the die and anvil assembly comprises rotary die 301 positioned between first anvil roller 309 and second anvil roller 303. Both first anvil roller 309 and also second anvil roller 303 rotate in one direction, while rotary die 301 rotates in the opposite direction. This rotational sequence of the die and anvil assembly draws secondary web material 310 in between first anvil roller 309 and rotary die 301 from one side of the die and anvil assembly. From the opposite side of the die and anvil assembly, rotary die 301 and second anvil roller 303 draw primary web material 302 into the apparatus.

As secondary web material 310 enters the apparatus between first anvil roller 309 and rotary die 301, rotary die 301 cuts secondary web material 310 into secondary web flash 312 and secondary web product 311. Secondary web flash removal mechanism 313 removes secondary web flash 312 from the apparatus and delivers secondary web flash 312 to a recycling apparatus (not shown). Secondary web product 311 adheres to rotary die 301 and rotates around with the rotary die 301 to enter between rotary die 301 and second anvil roller 303. In this way, secondary web flash 312 is removed prior to lamination.

As secondary web product 311 rotates with rotary die 301, secondary web product 311 joins primary web material 302 as both secondary web product 311 and primary web material 302 are drawn into the apparatus between rotary die 301 and second anvil roller 303. Primary web material 302 and secondary web product 311 fuse together between rotary die 301 and second anvil roller 303, forming final product 306 in which the primary and secondary layers are indistinguishable. At this point, rotary die 301 also cuts primary web material 302 into primary web flash 308 and primary web product 305. Primary web product 305 joins secondary web product 311 to form final product 306. Primary web flash removal mechanism 307 removes primary web flash 308 from the apparatus, conveying primary web flash 308 to a recycling apparatus (not shown).

The preferred embodiment of the laminating apparatus is particularly useful for laminated products in which the layers of final product 306 cannot be effectively separated for recycling. Instead of attempting to recycle cut-away portions of the final laminated product, the die cutting apparatus separates the flash portions of each laminate layer for recycling before the layers are fused into a final laminated product. The rotary die 301 cuts each of the layers to matching size and shape so that the layers, when fused together, form the final laminated product requiring no further cutting or shaping. Since the same die, rotary die 301, cuts both of the pieces to be fused, a precise size match is assured.

In either the shaping or lamination configurations, there are additional structural components of the present invention that drive and add stability to the die and anvil roller(s) to ensure the proper feeding and processing of the primary and secondary web material. The structural components and their applications are typical of both the shaping and lamination configurations; for brevity, only the lamination configuration as shown in FIG. 3 is addressed herein. In the preferred embodiment of the present invention, a support roller 304 supports, stabilizes, and minimizes the deflection of the adjacent second anvil roller 303. Support roller 304 is driven by any suitable means, such as by gear and chain. In turn, support roller 304 can be configured to drive first anvil roller 309, rotary die 301, and second anvil roller 303.

Positioned above the die and anvil assembly is a truck assembly 315 that guides first anvil roller 309 and transfers a downward pressure on rotary die 301 to cut secondary web material 310 and shape primary web material 302. Examples of suitable means for applying the downward pressure include a pair of pneumatic cylinders, hydraulic jackscrews, or any conventional means for applying downward force to the die. The preferred embodiment of the present invention uses a pneumatic cylinder.

On both sides of the first anvil roller 309, nip rollers 318 contact, support, and drive the feeding of the secondary web material 310 and secondary web flash 312. Preferably, the nip rollers 318 are pneumatically controlled.

Above the truck assembly 315, a removable bridge plate 317 spans the die cutting apparatus to provide additional stability to rotary die 301, first anvil roller 309, and second anvil roller 303. The length of removable bridge plate 317 matches the width of the apparatus, e.g., 12 or 21 inches. Removable bridge plate 317 also permits convenient die changes.

Figure 5:
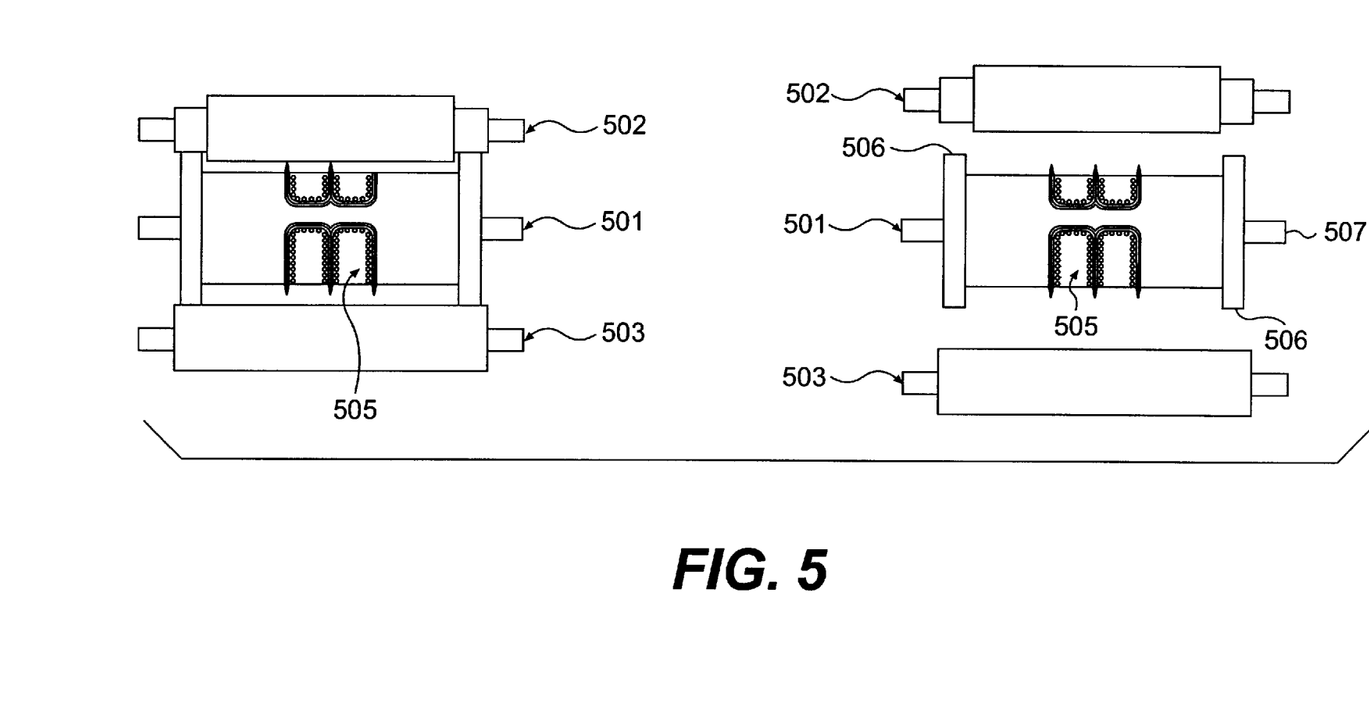
FIG. 5 is an enlarged front view of the anvils and rotary die of the sections illustrated in FIGS. 3 and 4.

The compressive force or downward pressure to the rotary die 301 may be applied to the bearer surfaces 506 or journals 507 of rotary die 301, as shown in FIG. 5. The bearer surfaces 506 of the rotary die are located at both ends of the cylindrical die and extend radially outward beyond the cutting surface of the die. The journals 507 are located on the outside of the apparatus, on both sides, where the axle of the rotary die exits the casing of the apparatus. In the preferred embodiment of the present invention, as shown in FIG. 5, the downward pressure is applied to the bearer surfaces 506 to prevent the rotary die 301 from lifting up off of the primary web material 302 as the primary web material 302 is being cut or laminated.

In the preferred embodiment of either the shaping or lamination configuration, the die cutting apparatus is equipped with one or more stations at which dies are located. FIGS. 1a–1b, 2, and 4 show a second station 102. The first and second stations can be identical or different depending upon the requirements of the manufacturing process. One die can be removed or changed without affecting the operation of the other die. As shown in FIG. 2, a lifting mechanism 210 is used to lift and hold a die out of service. Preferably, the lift mechanism 210 uses pneumatic cylinders; however, any other suitable lifting system, e.g., a crane system, may be used for die removal or installation.

In either the shaping or lamination configuration of the preferred embodiment of the present invention, a lubricant system is used to ease removal of the primary and/or secondary web flash. FIG. 3 illustrates an applicator 316 that lubricates the rotating rotary die 301 before the die contacts secondary web material 310. While any suitable lubrication means can be used, the preferred embodiment delivers the lubricant with a roll applicator. The roll applicator system applies the lubricant to the blades of rotary die 301 instead of to the entire secondary web material 310 or primary web material 302, thereby minimizing the amount of lubricant used. Additionally, using minimal lubricant prevents the web material from becoming damaged by over-saturation. While any suitable lubricant that is compatible with the laminate product and apparatus can be used, examples of desirable lubricants include aqueous soap mixtures, non-silicone-containing lubricants, and like fluids. To keep the flash and product portions from sticking to the press, the lubricating system is located to dispense the correct amount of lubricant where required. For best results, the lubricant is applied to rotary die 301 just before the location where secondary web material 310 contacts rotary die 301.

As an alternative to lubricant, another preferred embodiment applies adhesive with applicator 316 to handle web materials that are not inherently tacky. Instead of lubricating the die for easy removal of sticky flash, the applicator applies just enough adhesive to the die to keep a slippery web material on the die, but not so much adhesive that the material is difficult to remove.

To efficiently handle web material as it enters and exits the apparatus, the preferred embodiment of the present invention uses vacuum belts, or any other type of holding belt, to convey the web materials and final products while also applying the requisite amount of web tension. These belts carry primary web material 302 into the apparatus and convey final product 306 out of the apparatus to subsequent manufacturing processes or to packaging for shipment. Optionally, a single vacuum belt can be used on the outgoing side of the apparatus to pull a web material and liner in between the rotary die and anvil roller and to pull the final product out.

By using vacuum belts, the apparatus does not have to touch the top of the primary web material 302 or the top of final product 306, thereby eliminating the handling damage often inflicted by the nip or pinch rollers known in the art. The belt may be driven independently, or by the motor that drives the support roller 304. In the preferred embodiment, the motor driving the rotary die 301 also drives the belt, thereby providing enhanced process control. The adjustable speed control customizes the apparatus for different lengths of processed material.

Figure 3A:
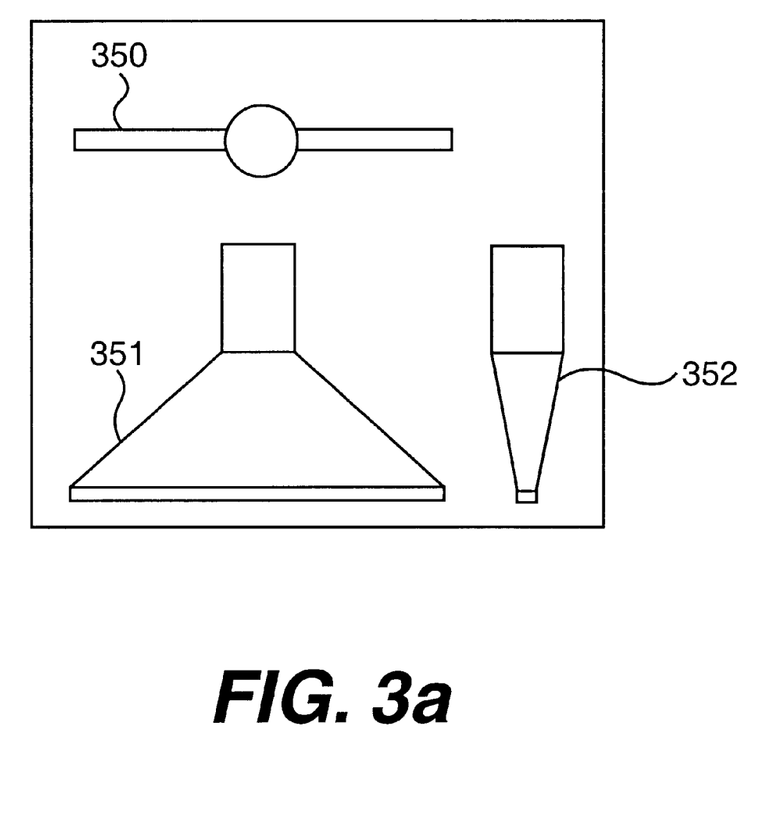
FIG. 3a is an elevation view of the flash removal vacuum nozzle system components illustrated in FIG. 3.

For the shaping and lamination configurations, the flash removal mechanisms remove primary web flash and secondary web flash from the apparatus. As shown in FIGS. 3 and 3A, the preferred embodiment of the present invention uses vacuum nozzle 314. Vacuum nozzle 314 applies a vacuum to rotary die 301 and withdraws secondary web flash 312 before it contacts primary web material 302. Vacuum nozzle 314 is especially useful when removing flash of undulating or varying configurations. FIG. 3A depicts the preferred vortex nozzle, showing a plan view 350, a front view 351, and a side view 352.

A second embodiment of the flash removal system is a cotton belt conveyor. To prevent the flash material from sticking to the belt, a soapy water solution can be applied to the belt.

For both the shaping and lamination configurations, in the preferred embodiment of the present invention, the rotary die and anvil roller are configured to provide specific cuts or shaping. As illustrated in FIG. 5, a stepped anvil roller 502 can be stepped down so as to touch the blades of rotary die 501 and cut through the primary or secondary web material to produce what is known as a through-cut. Alternatively, regular anvil roller 503 is offset from the cutting surface of the rotary die 501, thereby only cutting a portion of the material it contacts to produce what is known as a kiss-cut. Manufacturing processes use the kiss-cut to cut only a portion of a multi-layered material, e.g., cutting a primary web material but leaving an attached liner intact.

For the kiss-cut, rotary die 501 is configured to substantially the height needed to press the secondary web material onto the primary web material without cutting the liner. Alternately, foam 505 is located in the cavity of rotary die 501 to press the secondary web material to the primary web material. In addition to the preferred foam, any other like material could be used. Side nip rollers located on the stepped anvil roller 502 can be used to drive the secondary web flash though the press.

Figure 6:
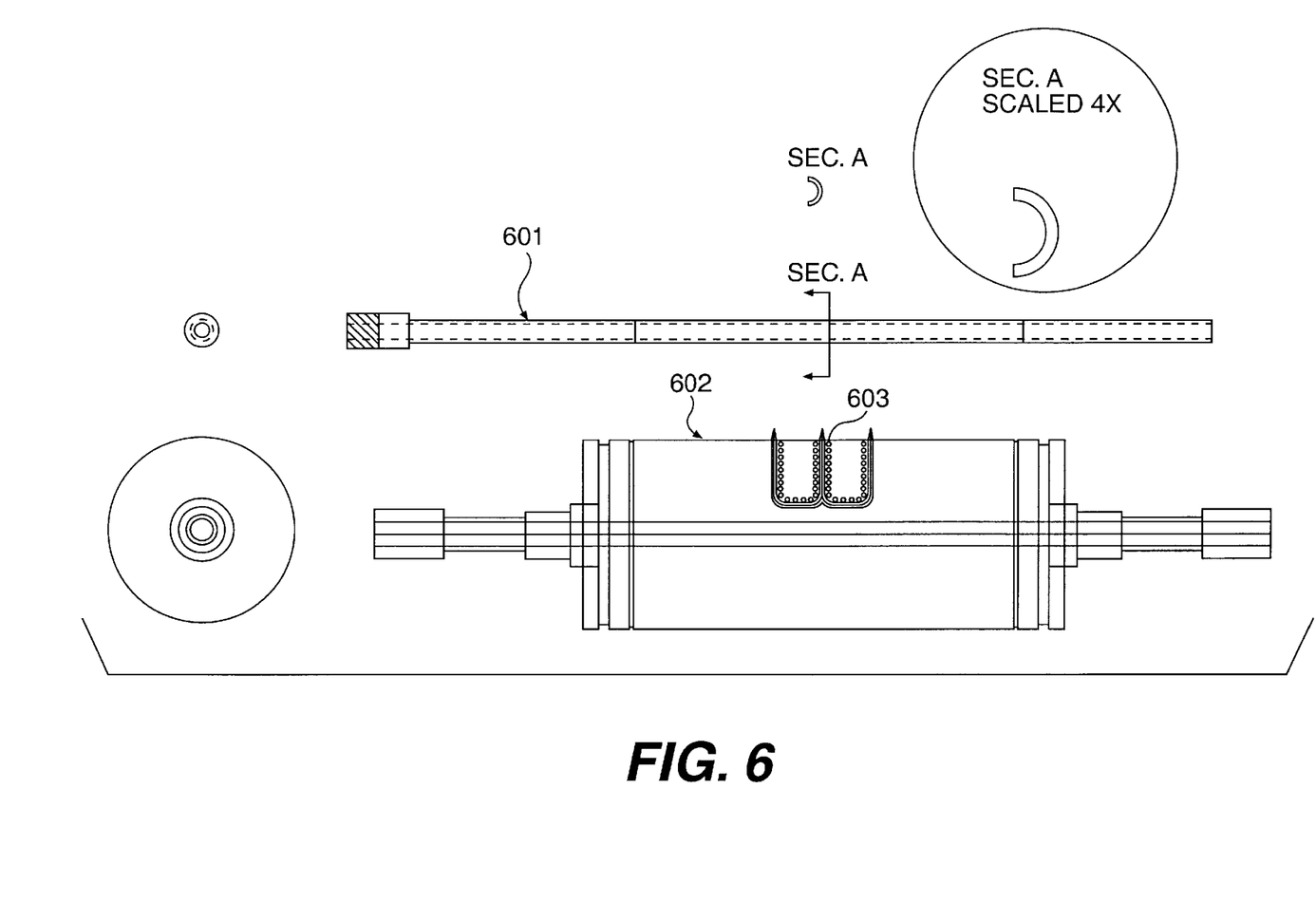
FIG. 6 is an exploded view of the rotary die illustrated in FIG. 5.

In the lamination configuration as shown in FIG. 3, the preferred embodiment of the present invention uses a rotary die 301 with an internal vacuum system to hold secondary web product 311 to the rotary die 301 while the secondary web flash removal mechanism 313 is removing secondary web flash 312. In FIG. 3, the shaded region of the rotary die 301 indicates where the vacuum is applied. FIG. 6 shows preferred construction of the rotary die vacuum system.

Referring to FIG. 6, a vacuum probe 601 having an open channel (a shoe or boat-like structure) is inserted into rotary die 602. Rotary die 602 incorporates vacuum holes 603 that extend from inside vacuum probe 601, through vacuum channels (interior to rotary die 602 and not shown), and out to the exterior surface of the rotary die 602. As the rotary die 602 rotates on vacuum probe 601, vacuum holes 603 will either align with the probe vacuum channels or a solid surface on the opposite side of vacuum probe 601. When the holes align with the probe vacuum channels a vacuum will be drawn through rotary die 602, and correspondingly, when the vacuum holes 603 align with the remaining part of the probe, no vacuum will be drawn.

Instead of a vacuum system, such a configuration of holes and channels could also supply coolant, e.g., brine or water, to the apparatus in an effort to inhibit the tacky material from sticking to the die.

To enhance the operation of the die cutting apparatus, a preferred embodiment of the present invention uses sensors, tension devices, and speed control devices to control and synchronize production speed, web tension, and web sheet height. These sensors, tension devices, and speed control devices well known in the art and commercially available. The speed at which material is introduced and removed from the die cutting apparatus is controlled and synchronized. Normally, the speed is increased or decreased in response to one or more sensors. The first sensor monitors the height of a continuous sheet of tacky material that is formed before entering the press, e.g., when a tacky material is extruded onto a liner and conveyed to the press where prior to entering the press (on the left hand side of FIG. 1*a*) the sheet height is lower than the operating plane of the apparatus. Normally, the sheet will be lower than the die apparatus and form a depression or loop prior to entering the apparatus. A relatively low web sheet height indicates that material is being supplied at too fast a rate or that the apparatus is operating too slowly.

The web height is monitored by using any suitable detection means such as an ultra sonic sensor. The motor driving the sheet rate into the die cutting apparatus responds to the sheet height by either increasing or decreasing support roller speed. The support roller can be driven by any suitable means such as by gear and chain. The material flow rate through the die cutting apparatus is synchronized with the support roller drive, flash removal and finish product removal belt to avoid applying tension to the materials being processed. The apparatus processes about 400 inches per minute and in some cases up to about 1,200 feet per minute. The sheet height can also be maintained manually using a manual speed control located on the press. Normally, a certain amount of tension is required to keep the sheet relatively straight as the sheet enters the apparatus. A small vacuum chamber or any other type of tension device may be used to apply small amount of tension to the web.

The die cutting apparatus and method are not limited to the components and processes described above, and can be employed with or incorporated into a wide array of systems. If desired, a plurality of rotary die presses can be employed for making a multi-layered laminate product. The materials combined to form the laminate product can be obtained from any suitable source, e.g., a roll of film, an extruder that is optionally functionally connected to the rotary die press apparatus, or other desirable sources. The laminate product can be further processed to enhance or modify the characteristics of the product, e.g., by exposure to a source of radiation, chemically treated, physically modified, for example, by heating or stretching, among other conventional material treatment methods. The apparatus for modifying the laminate product can also be functionally connected to the rotary die press or remote therefrom.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. An apparatus for laminating a primary web material and a secondary web material comprising:
    (a) a rotary die rotating in a first direction;
    (b) a first anvil roller contacting the rotary die and rotating in a second direction opposite to the first direction, wherein the secondary web material enters the apparatus between the rotary die and the first anvil roller such that the rotary die cuts the secondary web material into a secondary web product and a secondary web flash, wherein the secondary web flash is removed for recycling, and wherein the secondary web product adheres to the rotary die and travels around the rotary die;
    (c) a second anvil roller contacting the rotary die and rotating in the second direction, wherein the primary web material enters the apparatus between the rotary die and the second anvil roller, wherein the secondary web product travelling around the rotary die meets and adheres to the primary web material as the primary web material enters the apparatus between the rotary die and the second anvil roller, wherein the rotary die cuts the primary web material into a primary web product and a primary web flash, and wherein the primary web flash is removed for recycling and the primary web product that is attached to the secondary web product exits the apparatus;
    (d) a primary web flash removal mechanism that removes the primary web flash from the apparatus; and
    (e) a secondary web flash removal mechanism that removes the secondary web flash from the apparatus.

2. The apparatus of claim 1, wherein the primary web flash removal mechanism comprises a belt conveyor.

3. The apparatus of claim 1, wherein the secondary web flash removal mechanism comprises a belt conveyor.

4. The apparatus of claim 1, wherein the secondary web flash removal mechanism comprises a vacuum nozzle contacting the first anvil roller where the secondary web flash exits the rotary die and the first anvil roller.

5. The apparatus of claim 1, wherein the rotary die further contains a channel system through which a vacuum is drawn to adhere the secondary web product to the rotary die.

6. The apparatus of claim 1, wherein the rotary die further contains a channel system through which a coolant flows.

7. The apparatus of claim 1, further comprising an applicator that applies lubricant to the rotary die to ease removal of the primary web flash and the secondary web flash from the rotary die.

8. The apparatus of claim 1, further comprising an adhesive applicator that applies adhesive to the rotary die to temporarily adhere the secondary web product to the rotary die.

9. The apparatus of claim 1, further comprising:
    (f) a first side nip roller contacting the first anvil roller on a first side; and
    (g) a second side nip roller contacting the first anvil roller on a second side opposite to the first side.

10. The apparatus of claim 1, further comprising a control system that regulates the production speed, web tension, and web sheet height of the primary web material, the secondary web material, the primary web flash, the primary web product, the secondary web flash, and the secondary web product.

11. The apparatus of claim 1, wherein the rotary die contains a foam that presses the secondary web product onto the primary web product.

12. The apparatus of claim 1, wherein the first anvil roller is configured to produce a through-cut.

13. The apparatus of claim 1, wherein the first anvil roller is configured to produce a kiss-cut.

14. The apparatus of claim 1, wherein the second anvil roller is configured to produce a kiss-cut.

15. The apparatus of claim 1, wherein the second anvil roller is configured to produce a through-cut.

16. The apparatus of claim 1, further comprising a lifting mechanism on which the rotary die and the first anvil roller are mounted, said lifting mechanism being able to lift the rotary die and the first anvil roller out of service.

17. The apparatus of claim 1, further comprising:
    (f) a first vacuum belt, adjacent to the rotary die and the second anvil roller, wherein the first vacuum belt delivers the primary web material to the apparatus; and
    (g) a second vacuum belt, adjacent the rotary die and the second anvil roller, wherein the second vacuum belt conveys the primary web product away from the apparatus.

18. The apparatus of claim 1, wherein the primary web material comprises more than one layer and the first anvil roller is configured to produce a kiss-cut, wherein the rotary die cuts only one layer of the primary web material.

19. The apparatus claim 1, wherein the secondary web material comprises more than one layer and the second anvil roller is configured to produce a kiss-cut, wherein the rotary die cuts only one layer of the secondary web material.

20. The apparatus of claim 1, further comprising a plurality of die and anvil roller assemblies arranged in succession along a production line, each of the assemblies being mounted on lifting mechanisms,
    wherein a first assembly of the plurality of assemblies is engaged in production and a second assembly of the plurality of assemblies is lifted out of service, and wherein the first assembly is operable to be raised and the second assembly is operable to be lowered into production simultaneously.

21. The apparatus of claim 1, wherein (a) the rotary die and the first anvil roller are in longitudinal contact and are rotating in opposite directions, (b) the primary web material is cut by the rotary die into the primary web product and the primary web flash such that the primary web product is equal in size and shape to the secondary web product and is attached to the secondary web product to form a final product, and (c) the final product is conveyed away from the rotary die and the second anvil roller.

22. The apparatus of claim 21, wherein the primary web material is fed to the apparatus on a vacuum belt.

23. The apparatus of claim 21, wherein the final product is conveyed away from the apparatus on a vacuum belt.

24. The apparatus of claim 21, wherein the secondary web flash is removed by conveying the secondary web flash on a belt.

25. The apparatus of claim 21, wherein the secondary web flash is removed by vacuuming the secondary web flash off of the first anvil roller.

26. The apparatus of claim 21, wherein the primary web flash is removed by conveying the primary web flash on a belt.

27. The apparatus of claim 21, wherein the secondary web flash is removed by applying lubricant to the notary die to ease removal of the secondary web flash from the rotary die.

28. The apparatus of claim 21, wherein the primary web flash is removed by applying lubricant to the rotary die to ease removal of the primary web flash from the rotary die.

29. The apparatus of claim 21, wherein the secondary web product is adhered to the rotary die by applying a vacuum through the rotary die.

* * * * *